E. KNORRE.
SYSTEM OF UNDER WATER FOUNDATIONS FOR GREAT DEPTHS.
APPLICATION FILED FEB. 25, 1908.
1,010,642.
Patented Dec. 5, 1911.
2 SHEETS—SHEET 1.
Fig. I
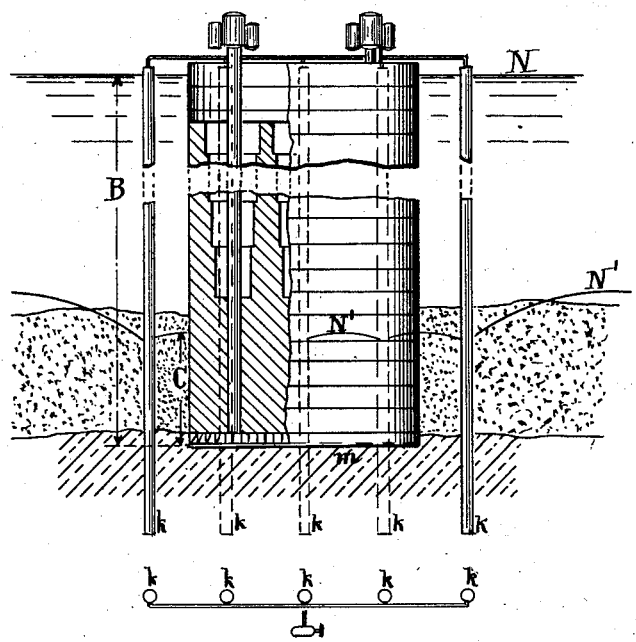
Fig. Ia
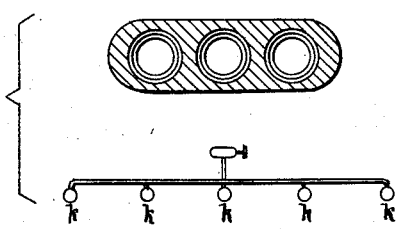
Inventor,
EUGENE KNORRE,

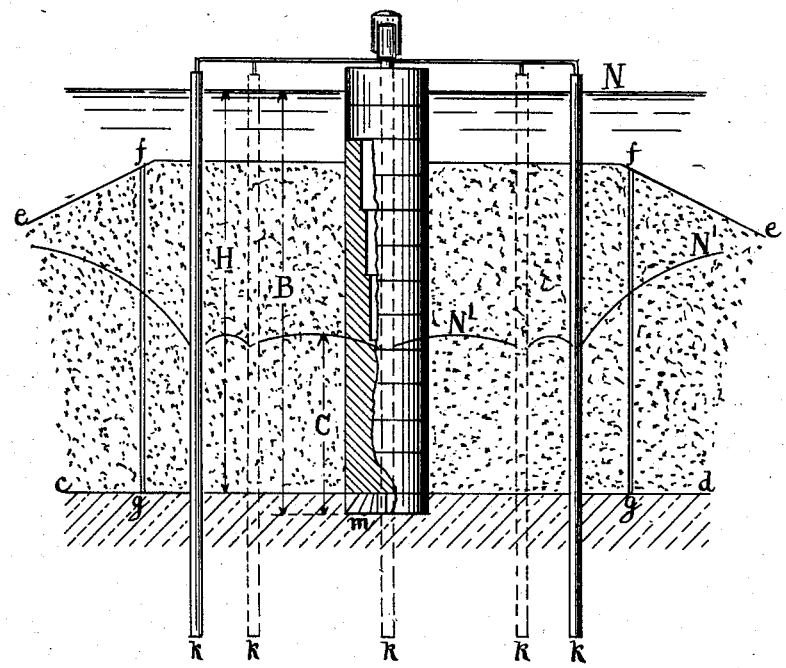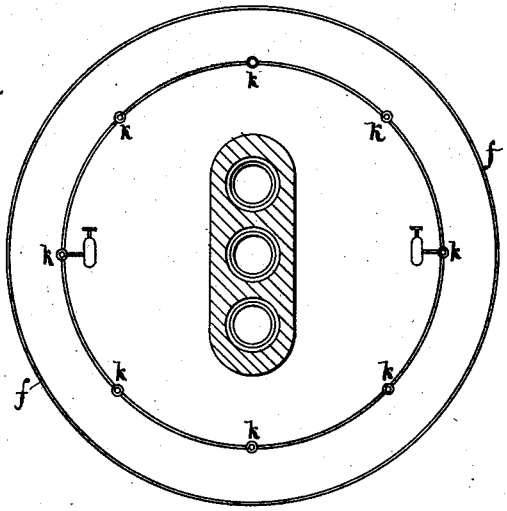

UNITED STATES PATENT OFFICE.

EUGENE KNORRE, OF ST. PETERSBURG, RUSSIA.

SYSTEM OF UNDER-WATER FOUNDATIONS FOR GREAT DEPTHS.

1,010,642.  Specification of Letters Patent.  Patented Dec. 5, 1911.

Application filed February 25, 1908. Serial No. 417,690.

*To all whom it may concern:*

Be it known that I, EUGENE KNORRE, a subject of the Emperor of Russia, and a resident of St. Petersburg, Russia, my post-office address being Kirpitchny Pereoulok 7, care of Kaupe & Tschekaloff, have invented certain new and useful Improvements in Systems of Under-Water Foundations for Great Depths, of which the following is a specification.

My invention has for its object an improvement in air pressure (pneumatic) foundations, which enables me to reduce in an artificial manner the air pressure in caissons to any desired extent.

This improvement makes it possible to attain very great depths in erecting under water foundations with moderate air pressure in the caissons, and to work with a foundation sole open to the eye without injuring the health of workmen by an exceedingly high pressure.

In the accompanying drawings, Figure I represents a side view, partly in section, of a caisson with my system applied thereto; Fig. I$^a$ is a horizontal section of same; Fig. II represents a modified arrangement of my system; Fig. II$^a$ is a horizontal section of same.

A row of tubular pits $k$, $k$ is arranged near the caisson in a straight line (Fig. I) or in a circle (Fig. II), the lower ends of the pits reaching under the projected depths of the sole $m$ of caissons. By pumping continuously from the pits $k$ the pressure height B can be artificially reduced to any desired lower level $N_1$, notwithstanding the high level N of the ground water, and consequently the air pressure in the caisson can be lowered to that corresponding to a height $b$. In cases of exceedingly great depths H (Fig. II) and for the purpose of reducing the air pressure at the beginning, I spread over and about the sole $m$ of the caisson a heap of sand in form of a truncated cone $e, f, f, e$, or of a cylinder held by a solid mantle $f\ g$ (Fig. II), the pumping of water by means of tubular pits $k$ being effected also out of this heap, thus reducing the pressure height B to a height $b$ or even to zero. The mantle $f\ g$ may be made of piles or any sufficiently solid construction, its purpose being to retain the mass of sand. It is thus obvious, that my system as applied to ordinary air-pressure foundations completely fulfils all the requirements of health conditions, even in cases of very great depths.

I claim as my invention:

1. The process for lessening the air pressure in caissons under great depths of water, which consists in locating in the vicinity of the caisson a series of tubes extending below the bottom of the caisson and continually pumping the water from the tubes.

2. The process for lessening the air pressure in caissons working in sand under great depths of water, which consists in surrounding the caisson with a heaped-up mass of sand, sinking in the neighborhood of the caisson a series of tubes extending below the bottom of the same, and continually pumping water from the tubes, substantially as set forth.

3. The process for lessening air pressure in caissons working in sand under great depths of water, said process consisting in surrounding the caisson with a heaped-up mass of sand, placing a retaining mantle in the sand and around the caisson spaced therefrom, sinking in the neighborhood of the caisson a series of tubes extending below the bottom of the same, and continually pumping water from the tubes.

In testimony whereof, I have signed my name to this specification in the presence of two subscribing witnesses.

EUGENE KNORRE.

Witnesses:
H. A. LOVIAGUINE,
ED. WANSCACIDT.